(12) United States Patent
Vunic

(10) Patent No.: US 9,141,859 B2
(45) Date of Patent: Sep. 22, 2015

(54) METHOD AND SYSTEM FOR SEGMENTING AND TRANSMITTING ON-DEMAND LIVE-ACTION VIDEO IN REAL-TIME

(75) Inventor: Douglas W. Vunic, New Rochelle, NY (US)

(73) Assignee: LiveClips LLC, El Segundo, CA (US)

( * ) Notice: Subject to any disclaimer, the term of this patent is extended or adjusted under 35 U.S.C. 154(b) by 731 days.

(21) Appl. No.: 12/272,170

(22) Filed: Nov. 17, 2008

(65) Prior Publication Data

US 2010/0123830 A1 May 20, 2010

(51) Int. Cl.
*H04N 5/14* (2006.01)
*G06K 9/00* (2006.01)

(52) U.S. Cl.
CPC .................. *G06K 9/00711* (2013.01)

(58) Field of Classification Search
CPC ................................. G06F 17/30787
USPC ......................... 348/700, 157, 153
See application file for complete search history.

(56) References Cited

U.S. PATENT DOCUMENTS

| | | | |
|---|---|---|---|
| 5,091,780 A * | 2/1992 | Pomerleau | 348/152 |
| 5,189,630 A | 2/1993 | Barstow et al. | |
| 5,526,479 A | 6/1996 | Barstow et al. | |
| 5,539,454 A | 7/1996 | Williams | |
| 5,671,347 A | 9/1997 | Barstow et al. | |
| 5,892,536 A | 4/1999 | Logan et al. | |
| 5,923,365 A | 7/1999 | Tamir et al. | |
| 5,986,692 A | 11/1999 | Logan et al. | |
| 6,088,455 A | 7/2000 | Logan et al. | |
| 6,144,797 A * | 11/2000 | MacCormack et al. | 386/224 |
| 6,204,862 B1 | 3/2001 | Barstow et al. | |
| 6,920,468 B1 * | 7/2005 | Cousins et al. | 1/1 |
| 6,931,451 B1 | 8/2005 | Logan et al. | |
| 7,055,166 B1 | 5/2006 | Logan et al. | |
| 7,058,376 B2 | 6/2006 | Logan et al. | |
| 7,211,000 B2 | 5/2007 | Jutzi et al. | |
| 7,224,852 B2 | 5/2007 | Lipton et al. | |
| 7,373,587 B1 | 5/2008 | Barstow et al. | |
| 7,399,277 B2 * | 7/2008 | Saidara et al. | 600/300 |
| 7,460,149 B1 * | 12/2008 | Donovan et al. | 348/143 |
| 7,596,759 B2 | 9/2009 | Verna | |
| 7,742,921 B1 | 6/2010 | Davis et al. | |
| 7,904,797 B2 | 3/2011 | Wong et al. | |
| 2002/0093591 A1 | 7/2002 | Gong et al. | |
| 2002/0114493 A1 | 8/2002 | McNitt et al. | |

(Continued)

FOREIGN PATENT DOCUMENTS

| | | |
|---|---|---|
| EP | 1197020 | 11/2007 |
| EP | 1968066 A1 | 9/2008 |
| WO | 2012/155279 A2 | 11/2012 |

OTHER PUBLICATIONS

International Search Report for International Application No. PCT/US2009/064573, mailed on Apr. 12, 2010.

(Continued)

*Primary Examiner* — Dave Czekaj
*Assistant Examiner* — Leron Beck

(57) ABSTRACT

A method and system for producing video-segments of a live-action event involving monitoring a live-action event for detection of event-segments, detecting one or more event-triggers with detectors, determining if an event-segment occurred based on the detected event-triggers, and editing one or more video feeds into a video-segment to encompass the event-segment.

60 Claims, 6 Drawing Sheets

(56) References Cited

U.S. PATENT DOCUMENTS

| | | | |
|---|---|---|---|
| 2003/0160944 | A1 | 8/2003 | Foote et al. |
| 2004/0064207 | A1* | 4/2004 | Zacks et al. ............. 700/91 |
| 2004/0068758 | A1 | 4/2004 | Daily et al. |
| 2004/0080615 | A1 | 4/2004 | Klein et al. |
| 2004/0125877 | A1 | 7/2004 | Chang et al. |
| 2006/0044446 | A1 | 3/2006 | Porter et al. |
| 2006/0246972 | A1* | 11/2006 | Thomas et al. ............. 463/4 |
| 2007/0100521 | A1 | 5/2007 | Grae |
| 2007/0101394 | A1 | 5/2007 | Fu et al. |
| 2007/0106507 | A1 | 5/2007 | Charoenruengkit et al. |
| 2008/0019594 | A1 | 1/2008 | Hiraizumi et al. |
| 2008/0088482 | A1* | 4/2008 | Okada et al. ............. 340/937 |
| 2008/0089666 | A1 | 4/2008 | Aman |
| 2008/0130997 | A1 | 6/2008 | Huang et al. |
| 2008/0138029 | A1 | 6/2008 | Xu et al. |
| 2008/0281592 | A1 | 11/2008 | McKoen et al. |
| 2010/0245072 | A1 | 9/2010 | Harel |
| 2011/0052061 | A1 | 3/2011 | Jeong et al. |
| 2011/0102678 | A1 | 5/2011 | House et al. |
| 2013/0283143 | A1 | 10/2013 | Petajan et al. |
| 2013/0293776 | A1 | 11/2013 | Shi-Fu et al. |

OTHER PUBLICATIONS

International Search report and Written Opinion mailed on Dec. 27, 2012 for International Application Serial No. PCT/US2012/038516, 9 pp.

Rui, Yong; Gupta, Anoop; Acero, Alex; "Automatically Extracting Highlights for TV Baseball Programs"; Proceedings ACM Multimedia; Oct. 30, 2000; pp. 105-115; XP002272069.

Supplementary European Search Report dated Sep. 25, 2014 in European Patent Application No. 12785552.6 filed May 18, 2012 by Douglas W. Vunic et al.

Sadlier, David A. and O'Connor, Noel E. (2005) "Event detection based on generic characteristics of field-sports", In: ICME 2005—Proceedings of the IEEE International Conference on Multimedia and Expo, Jul. 6-8, 2005, Amsterdam, The Netherlands, pp. 1-4.

Georgio Diamantopoulos, Michael Spann, "Event Detection for Intelligent Car Park Video Surveillance", Science Direct, available online at www.sciencedirect.com Jun. 13, 2005, 11 pp.

"Evaluation of Smart Video for Transit Event Detection", Project #BD549-49, Final Report, by National Center for Transit Research et al., Jun. 2009, 85 pp.

Tian, Yin-li et al., "Event Detection, Query, and Retrieval for Video Surveillance", Book Chapter for Artificial Intelligence for Maximizing Content Based Image Retrieval, pp. 1-3.

Beale, Stephen et al., "Semantic Analysis in the Mikrokosmos Machine Translation Project", In Proc. Symposium on NLP, Saset Sart University, Bangkok, Thailand 1995.

MPEG-7 Overview (version 10) (ISO/IEC JTC1/SC29/WG11N6828) Palma de Mallorca, Oct. 2004, "http://mpeg.chiariglione.org/standards/mpeg-7/mpeg-7.html", 70pp.

Martinez, Jose M et al., "MPEG-7: The Generic Multimedia Content Description Standard," Copyright 2002 IEEE. Reprinted from IEEE Computer Society, Apr.-Jun. 2002, pp. 78-87.

Wang, F. et al., "A Generic Framework for Semantic Sports Video Analysis Using Dynamic Bayesian Networks," *IEEE, Proceedings of the 11th International Multimedia Modelling Conference*, 2005.

Sadlier, D. et al., "Event Detection Based on Generic Characteristics of Field-Sports," *IEEE, Centre for Digital Video Processing*, Dublin City University, Ireland, 2005.

Written Opinion of the International Searching Authority for International Application No. PCT/US2009/064573, date of completion: Mar. 29, 2010.

Tian, Yin-Li et al.; "Event Detection, Query, and Retrieval for Video Surveillance"; Book Chapter for Artificial Intelligence for Maximizing Content Based Image Retrieval; 2009; 30 pages.

Non-final Office action dated Jul. 8, 2013 in U.S. Appl. No. 13/111,738, filed May 19, 2011 by Douglas W. Vunic et al.

Final Rejection dated Mar. 14, 2014 in U.S. Appl. No. 13/111,738, filed May 19, 2011 by Douglas W. Vunic et al.

Final Rejection dated Sep. 9, 2014 in U.S. Appl. No. 13/111,738, filed May 19, 2011 by Douglas W. Vunic et al.

Notice of Allowance dated Dec. 22, 2014 in U.S. Appl. No. 13/111,738, filed May 19, 2011 by Douglas W. Vunic et al.

Written Opinion of the International Preliminary Examining Authority dated Jun. 28, 2013 in International Application No. PCT/US2012/038516 filed May 18, 2012 by Douglas W. Vunic et al.

International Search Report and Written Opinion dated Sep. 6, 2013 in International Application No. PCT/US2013/037545 filed Apr. 22, 2013 by Eric David Petajan et al.

D'Orazio et al.; "A Review of Vision-Based Systems for Soccer Video Analysis"; Pattern Recognition; Elsevier Ltd.; vol. 43, No. 8; Aug. 1, 2010; pp. 2911-2926; XP002612059; ISSN:0031-3203; DOI: 10.1016/J. PATCOG.2010.03.009 [retrieved on Mar. 19, 2010] the whole document.

Invitation to Pay Additional Fees and, Where Applicable, Protest Fee and Annex Communication relating to the results of the Partial International Search dated Jun. 18, 2015 in International Application No. PCT/US2015/016166 filed Feb. 17, 2015 by Eric David Petajan et al.

International Search Report and Written Opinion dated Aug. 3, 2015 in International Application No. PCT/US2015/016166 filed Feb. 17, 2015 by Eric David Petajan et al.

Lu, Wei-Lwun et al.; "Learning to Track and Identify Players from Broadcast Sports Videos"; IEEE Transactions on Pattern Analysis and Machine Intelligence; IEEE Computer Society; USA; vol. 35, No. 7; Jul. 1, 2013; pp. 1704-1716; XP011510389; ISSN: 0162-8828; DOI: 10.1109/TPAMI.2012.242; paragraph [02.2].

Abdul Halin, Alfian et al.; "Soccer Event Detection Via Collaborative Multimodal Feature Analysis and Candidate Ranking"; Nov. 30, 2011; XP055204609; Retrieved from the internet: URL:http://www.iajit.org/PDF/vol.10,no.5/4565-9.pdf; [retrieved on Jul. 24, 2015]; p. 1-p. 3.

Babaguchi, Noboru et al.; "Intermodal Collaboration: A Strategy for Semantic Content Analysis for Broadcasted Sports Video"; Proceedings 2003 International Conference on Image Processing; Barcelona, Spain; Sep. 14-17, 2003; IEEE; Piscataway, New Jersey, USA; vol. 1; Sep. 14, 2003; pp. 13-16; XP01067054; ISBN: 978-0-7803-775-9; p. 16.

\* cited by examiner

US 9,141,859 B2

METHOD AND SYSTEM FOR SEGMENTING AND TRANSMITTING ON-DEMAND LIVE-ACTION VIDEO IN REAL-TIME

FIELD

Video content management, and more specifically, video segmentation.

BACKGROUND

By way of a simplified overview, this invention is directed to a method for segmenting and transmitting on-demand real-time video clips from live events to cellular telephones or personal computers. Live-action events, such as professional sporting events, are typically filmed using multiple cameras positioned around a stadium. Each camera produces a video feed that is then subsequently edited into a single feed that is then broadcast on television by a television network or a television station. The desire exists among viewers and fans of live televised events, such as a baseball game, to watch highlights of the game shortly after those highlights actually occur in the game. Highlights typically comprise important moments in the live-action event or the game that a viewer wishes to see again. Typically, however, viewers must rely upon the televised broadcast, as it is edited by the television network or station, to display certain highlights, such as instant-replays. Viewers typically cannot request and view highlights on-demand at substantially the same time, or within seconds or minutes of those highlights occurring in the game. Viewers also cannot typically pre-select the types of highlights—or instant replays—they wish to see. Nor can viewers typically request to view a highlight from a specific camera angle, including a camera angle that recorded the highlight, but was not used to televise that moment in the edited video-feed broadcast by the network or station. Rather, viewers must rely upon the television network or station to display the highlights that it presumes the viewers wish to see and only from the camera angles used in the edited and televised broadcast video feed. Nor can viewers of a live-action televised event typically request that the highlights they wish to see, from the camera angle they wish to see it, be transmitted to their cellular telephone or their personal computer shortly after it occurs in the game.

For viewers to be able to request to see any highlight they wish, from the camera angle they prefer, would presumptively require manual operators monitor the video feeds of live-action events. The manual operators would locate all possible highlights that viewers might wish to see. This would include highlights that the television network or station would not intend to broadcast. Upon locating what might be a highlight—such as a baseball batter swinging and missing for a third strike—the manual operator would physically edit the clip so that enough time occurs before the batter swings and after the batter swings. This way the highlight would be meaningful to the viewer. In other words, the manual operator would have to determine how much time to place before the batter swings, as well as how much time to place after the batter swings, so that a viewer watching the clip appreciates the clip. In addition, the manual operators would have to monitor every camera angle, including the edited video feed comprising a number of camera angles that is actually broadcast to television viewers. For each camera feed, the manual operator would have to physically edit and produce a short video-clip of the highlight. Producing video-clips that contain highlights using the foregoing manner would impose considerable costs and resources on television networks and television stations or any other video management system. The costs and resources that need to be expended to manually produce a plurality of video-clips would typically be economically impractical and unfeasible.

SUMMARY

The foregoing problems are addressed by a method and system for producing video-segments of a live-action event involving monitoring a live-action event for detection of event-segments, detecting one or more event-triggers with detectors, determining if an event-segment occurred based on the detected event-triggers, and editing one or more video feeds into a video-segment to encompass the event-segment.

DETAILED DESCRIPTION OF THE DISCLOSURE

Figure 1:
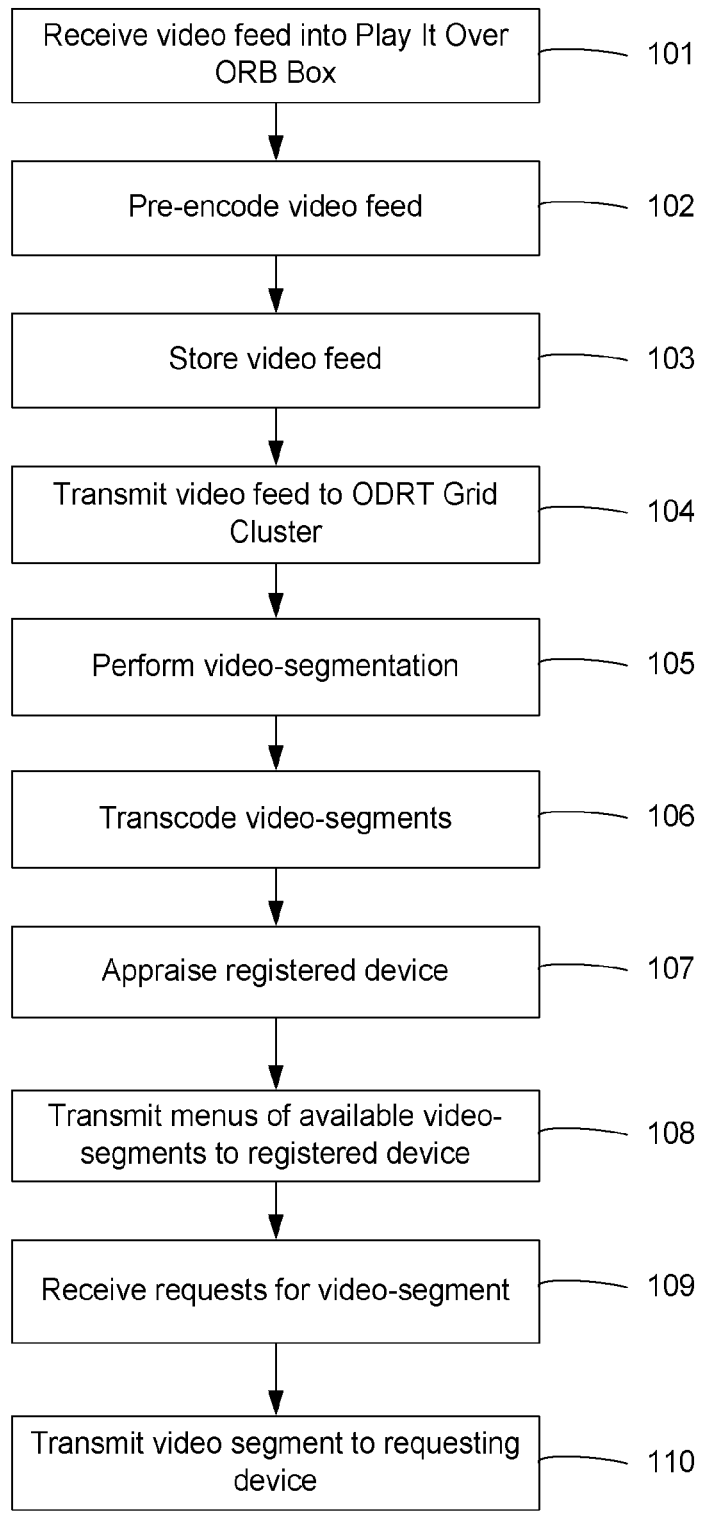
FIG. 1 is a flowchart illustrating the steps followed in performing transmitting on-demand real-time video segments of live action events.

Turning to the drawings, FIG. 1 is an illustration of a the method of segmenting and transmitting on-demand live-action video in real-time. Initially, there is an event that is being filmed and broadcast live. For example, a live action event can include, without limitation, and without intending to limit the scope of the claims, a sporting event, such as a baseball game, a football game, a soccer game, a hockey game, or a car race, such as a NASCAR race. In alternative embodiments, the live event can also be a non-sporting event, such as a music concert, a theater performance, and so forth. In alternate embodiments, the live event can be interviews after a professional sporting match, include, without limitation, in a locker room, in the hallway outside of a tennis stadium, or in some other location. In alternate embodiments, the live event can be a rollercoaster at an amusement park, where a video feed captures park patrons as they roll down the steepest descent, and after exiting the roller coaster, a video-clip is transmitted to their cellular telephones. In alternate embodiments, the live event can be events back stage at a musical concert, a theater performance, or any other event for which there is a live video feed. In alternate embodiments, the live event can encompass a video feed capturing the pit crew tune-up a car in a NASCAR or Formula One race. In still alternate embodiments, the live event can encompass any live-action event captured by a live video feed.

Live sporting events are typically filmed and broadcast to viewers from a number of different angles. One or more cameras record live video content. The cameras are placed at different locations around the arena or stadium that is hosting the event. Each of the cameras continuously records the event from its respective location, and accordingly, the cameras each record the event simultaneously. To broadcast the event to viewers, a video feed from each of the cameras is typically compiled and edited to form a single edited video-feed that switches back and forth between a plurality of camera angles. For example, a televised broadcast of a live baseball game will continuously switch between a number of different camera angles while televising the broadcast in real-time.

Turning back to FIG. 1, in STEP 101, one or more video-feeds is received into a computer processor or a server. Each video-feed comprises video content that captured the live-action event. In one embodiment, each video-feed is a single video-feed. In alternative embodiments, one or more of the received one or more video-feeds is an already edited compilation of a plurality of camera angles, such as the edited video feed that viewers of a televised baseball game will typically watch on their television. In alternate embodiments, a plurality of single or pre-edited video feeds capturing video content of the same event are received. In alternate embodiments, a plurality of computer processors or servers receives the plurality of one or more video feeds of the live-action event.

In one embodiment, one or more of the video-feeds is received simultaneously with the live-action event. In alternate embodiments, one or more of the video-feeds is received at substantially the same time as the live-action event. In alternate embodiments, one or more of the video-feeds contains a delay, wherein it is not exactly synchronized with the live-action event.

In an alternate embodiment, the video-feed, whether a single video-feed or a plurality of video-feeds, whether edited or not edited, are received into an PlayItOver ORB Box (hereinafter, "Orb Box"). The Orb Box comprises a server dedicated to providing one or more services related to the method described herein. In one embodiment, the Orb Box runs a Linux operating system. In alternate embodiments, alternate operating systems are used to run the Orb Box, including, without limitation, server operating systems provided by FreeBSD, Solaris and/or Microsoft.

In STEP 102, after the computer processor, server or Orb Box receives the plurality of one or more video feeds containing pre-edited or unedited video content of the live-action event, then the processor or the Orb Box pre-encodes the video content. The computer processor comprises memory for storing the video-feeds. Typically, the video feeds received by the computer processor, server or the Orb Box are high definition and/or comprise high frame rates. Accordingly, in one embodiment, pre-encoding is performed on the input video feeds. Pre-encoding comprises, without limitation, scaling down and/or compressing the high-definition and/or high-frame rate video feeds to facilitate the method of video segmentation, as described in more detail below, via a more economical expense of computer resources. One goal of pre-encoding is to conserve available storage space and buffering capacity. In an alternate embodiment, pre-encoding, including, without limitation, scaling down and/or compressing a high-definition and/or high-frame rate video feed, is not performed. Whether or not to perform pre-encoding will generally be determined as a design-decision of the user with respect to the most economical use of available computing processing power, resources, and storage capacities.

In STEP 103, the received video feeds are stored. Means for storing the received video feeds containing video content of the live-action event, whether pre-encoded or not pre-encoded, are well-known in the art.

In STEP 104, the video feeds received by the computer processor, server or the Orb Box from the broadcaster's cameras are transmitted in real-time to another computer processor, server or cluster, such as the ODRT Grid Cluster (hereinafter, collectively, the "Cluster"). In one embodiment, the Cluster comprises one or more linked computers connected through a local-area-network. In an alternate embodiment, the Cluster comprises one or more linked computers connected through a public, private or internet network. In an alternate embodiment, the Cluster uses distributed and/or grid computing run through one or more computers. In an alternate embodiment, the Cluster comprises one or more processors connected by a local high-speed computer bus. In still alternate embodiments, the Cluster comprises additional means well-known in the art for forming a computer cluster. In still another embodiment, the received video-feeds by a server are not transmitted to the Cluster, but a design-preference of the user dictates that certain steps of the present disclosure are performed at the same processor, server and/or Cluster, based upon available processing resources and storage capacity.

In STEP 105, the Cluster performs video segmentation of the live video content. Video-segmentation will be described in more detail below with reference to FIG. 2. The result is a video-segment, or a video-clip containing an event-segment, or a highlight from the live action event, along with attendant metadata that describes the highlight.

In STEP 106, a segmented video clip, or a video-segment, with attendant metadata, is transcoded. In one embodiment, digital data representing the video and audio content of the segmented clip (or video-segment), and its attendant metadata, is transcoded, or modified from a digital video stream having one set of characteristics to a digital video stream having an alternate set of characteristics. As is generally known in the art, different sets of characteristics pertain to different protocols (e.g. compression protocols, including, without limitation, MPEG and MPEG2) and data rates. A segmented video clip (video-segment) is transcoded into a number of pre-selected and/or predetermined encoding schemes. An encoding scheme comprises the specific protocols for compressing, forward error-correcting, modulating and/or transmitting digital or analog data. Pre-selected encoding schemes are initially designated to conform to the operating system and formats used by the plurality of cellular telephone network carriers and devices, as well as personal computers receiving video content over the internet. Transcoding is described in more detail below.

In STEP 107, a registered device is appraised with respect to a plurality of characteristics. Registered-device appraisal determines the optimal parameters (i.e., encoding scheme) for which to transmit the segmented video-clip to the requesting device. Registered-device appraisal of a requesting user's device is described in more detail below. In STEP 108, pursuant to the determined appraisal of registered devices, menus containing a selection of video-segments that are available for display are transmitted to a device. This step is described in more detail below with reference to FIG. 5. In STEP 109, requests to view a specific video-segment is received. In STEP 110, the requested segmented video-clip (video-segment) is transmitted to the requesting device.

It will be appreciated by those skilled in the art that in alternate embodiments, the steps of pre-encoding, storing, transcoding, transmitting to an alternate processor or server for video-segmenting, as well as other steps disclosed herein with respect to FIG. 1 are not required to follow a chronological order that mirrors the order of the steps as disclosed herein, as set forth in FIG. 1, nor as the relevant steps and elements are set forth in the claims. Design-decisions pursuant to the user's preferences with respect to processing capabilities and storage capacity can be made to perform pre-encoding, transcoding, video-segmenting, storage and additional elements and steps in a chronological order that differs from the order of the elements and steps set forth above, in FIG. 1, or in the claims. It will also be appreciated by those skilled in the art that in another alternate embodiment, multiple steps, including, without limitation, the steps disclosed herein with reference to FIG. 1, can occur simultaneously pursuant the user's available processing capabilities.

Figure 2:
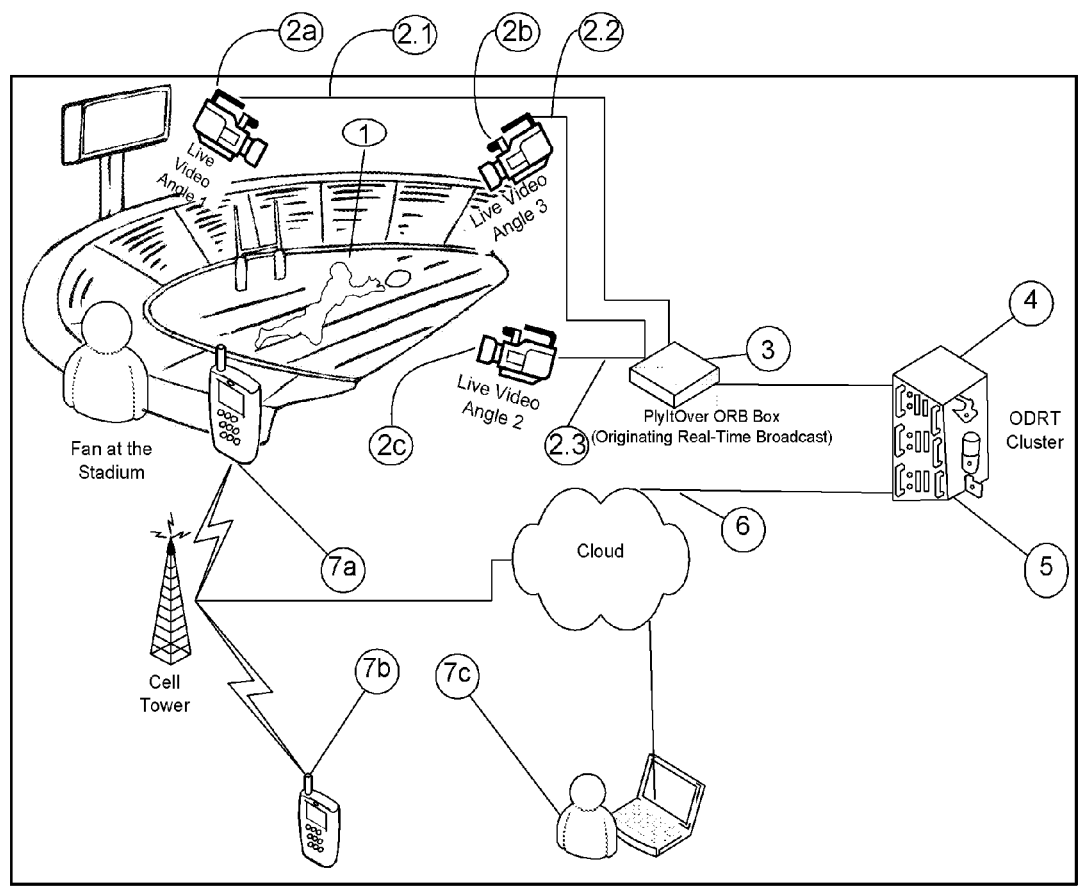
FIG. 2 is a diagram illustrating an embodiment of a system for transmitting on-demand real-time video segments of live action events.

Turning to FIG. 2, this is an illustrative embodiment of an embodiment of the system corresponding to the method disclosed with reference to FIG. 1. Initially, there is a live-action event 1 that occurs inside of a stadium or arena. In this particular embodiment, which comprises an example, and is not intended to limit the scope of the claims, live-action event 1 comprises a football game. Multiple cameras 2, including live-video angle 2a, 2b and 2c, are positioned around the stadium hosting the live-action event 1. Video feeds from each camera, 2a, 2b, and 2c, are received via lines 2.1, 2.2, and 2.3 to the PlayItOver Orb Box 3. In alternate embodiments, lines 2.1, 2.2, and 2.3 are not required to be individual serial direct connections input into the Orb Box, but can encompass parallel and/or multiplexed connections or additional types of connections of one or more video feeds into the Orb Box, as is generally known by those skilled in the art. The Orb Box 3 pre-encodes each of the received video-feeds, scaling them down from high-definition, high-frame rates, and then stores the pre-encoded video-feeds. The ODRT Cluster 4 receives the pre-encoded video-feeds and performs video-segmentations, which is described in more detail below, to determine when to trim each video-feed so that it includes a game highlight, or another event determined to be segmented into a video clip. Metadata 5 is added to the trimmed video-clip (or video-segment), and it is then transmitted to a plurality of registered requesting end-user devices, which can include I-phones 7a, cellular telephones 7b or personal computers 7c.

Video Segmentation

Figure 3:
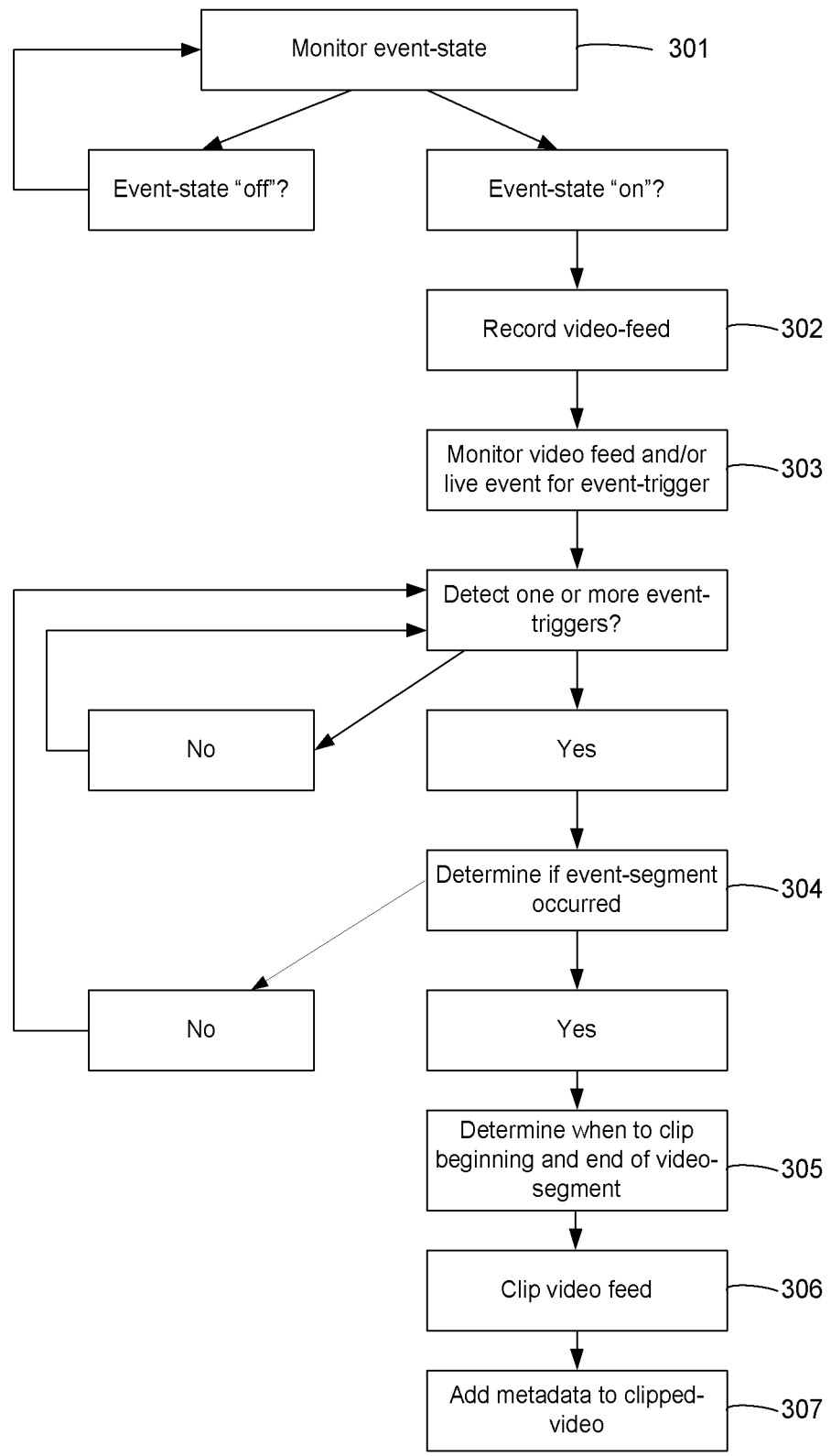
FIG. 3 is a flowchart illustrating the steps followed in performing video-segmentation.

The method of video-segmentation will now be described in more detail. FIG. 3 illustrates the steps of a method directed to segmenting the live video feeds into individual clips. By way of a brief descriptive overview, first it is determined if the event-state is on or off, and if it is on, the received video feeds are recorded. Typically, if a baseball game is experiencing a commercial break, the event-state will be determined to be off, and the video-feeds will not be recorded. When the event-state is on (for instance, when the baseball game is in play) then different types of detectors monitor both the live video feed and/or the live physical action occurring at the live-action event for detections of events that might be something viewers would prefer to see again, hereinafter referred to as "event-triggers". Event-triggers comprise detections that exceed or are beyond a predetermined threshold or value that indicates that something important, or worth watching, is happening in the live-action event. Detected event-triggers may be indicative of an event that requires video-segmentation because it is something viewers would prefer to see again. By way of an example, and without intending to limit the claims, typically, baseball fans are interested in viewing a batter swinging and hitting a homerun. On the other hand, typically, fans are less interested in viewing a batter swinging a bat before stepping up to the plate. Detectors monitor the video feed and/or the live-action event for event-triggers that are indicative of the batter hitting a homerun rather than swinging a bat before stepping up to a plate. In this example, hitting a home run would comprise an "event-segment", whereas simply swinging the bat before stepping up to the plate would not. Both swings of the bat, however, would comprise "event-triggers." Event-segments are events that are determined to be segmented into a video-segment. By way of an example, and without intending to limit the scope of the claims, a radar gun monitors increased changes in bat velocity, and thus, a bat swinging constitutes an event-trigger. A bat swinging might be indicative of an event-segment, i.e., a homerun, or it might not be indicative of an event-segment, i.e., a batter warming up by swinging the bat before stepping up to the plate. By way of additional examples, and without intending to limit the scope of the claims, event-segments can comprise: the last 30 seconds of a video shot from the goal in a hockey game, or in the alternative, from the goalie's helmet; a short video of a user on a rollercoaster at the point of the steepest descent; sports locker-room interviews; an interview backstage at a musical concert; cheerleaders doing flips; the last-lap video from inside a car in a car race; and so forth.

One or more event-triggers are therefore used to determine if they are indicative of an event-segment. If so, the time of the event-segment—in the foregoing example, the batter hitting a homerun—is recorded, and the recorded video-feed is trimmed to begin and end so that the trimmed video-clip includes the event-segment. Additional metadata is added to the trimmed video-clip that describes information about the video-segment, such as, in this example, the player's name and that he hit a homerun. The result is the trimmed video-clip recorded from the live video feed that contains the event-segment, as determined by the plurality of one or more event-triggers. As indicated above, the trimmed video-clip with the added metadata will be referred to as a "video-segment".

A brief overview of FIG. 3 is as follows: In STEP 301, the live-action event or the plurality of one or more video-feeds or both are monitored to determine the event-state. If the event-state is determined to be "on", rather than "off", then in STEP 302, recording of the live-action video feed is performed. In STEP 303, the live-action event or the recorded video feed is monitored for event-triggers. In STEP 304, upon detection of one or more event-triggers, the time of the event-triggers is recorded, and those event-triggers are used to determine whether an event-segment has occurred. If it is determined that an event-segment has occurred, in STEP 305, it is determined when the recorded video is to be clipped to begin at a specific time and to end at a specific time. In STEP 306, the recorded video is clipped according to the determinations in STEP 305. In STEP 307, metadata is added to the trimmed video-clip, and the resultant product is a video-segment.

At this point, in one embodiment, the process continues to monitor the live-action event for event-triggers that are indicative of additional event-segments that can be clipped into video-segments. By way of an example, and without intending to limit the scope of the claims, in a baseball game, if a pitch resulting in a foul ball is clipped into a video-segment, then the process continues to monitor the live-action event or the video-feed for the next event-segment, which in this example, will most likely constitute the next pitch. In one embodiment, the process returns to STEP 301 to determine if the event-state is "on" or "off" or an analogous user-defined determination with respect to the event-state. In an alternate embodiment, the process returns to STEP 303, where the live-action event or the recorded video feed is monitored for event-triggers indicative of another event-segment that can be segmented into a video-segment. In alternate embodiments, after each video-segment is clipped, the process returns to STEP 303 while simultaneously monitoring the event-state, and in the event that the event-state is determined to be "off", then following segmentation of a video-segment, recording of the video-feed stops and the process does return to STEP 303 only at a subsequent time when the event-state is again determined to be "on".

In STEP 301, the video feed is monitored to determine the event-state. An event-state indicates whether a live-action event is actively proceeding or whether an intermission is occurring. Live-action events, such as sporting events, typically oscillate between being active or non-active is some relative form. For instance, if a musical concert is being televised live, then a commercial break or a televised intermission does not correlate to an event that a user would likely wish to see again. Similarly, users may also not wish to clip into an event-segment the duration of a time-out during football game or basketball game. Similarly, a commercial break during a baseball game does not likely contain any event-triggers.

Users determine as a design choice what does and does not constitute an event-state. This design-choice will be based upon the respective live-action event or sporting event for which video segmentation is being used. In some instances, the entire event constitutes a single, unchanging event-state, such as "on". By way of an example, and without intending to limit the scope of the claims, the first set of a live televised musical concert that runs uninterrupted may constitute a single event-state. Thus, in this example, recording of the entire first act would continue uninterrupted, and as will be described in greater detail below, pursuant to a user's preferences, the concert is monitored for event-triggers indicative of event-segments. Event-segments may constitute individual songs, and the recorded video-feed is clipped into video-segments that each encompass an individual song played during the set of the concert before intermission. At intermission, the event-state is determined to be "off", and recording is halted until the event-state is once again determined to be "on", i.e., the band has returned to the stage. Users therefore determine as a design-choice those event-states likely to contain event-triggers and those unlikely to contain event-triggers.

In one embodiment, to determine an event state, the clock is monitored. For many sporting events, a clock controls when a sporting event is "in play" and the remaining time before the respective game, quarter, period, half and so forth expires. Typically, the clock will be stopped during play for a time-out, for a commercial break, or for some other reason. By way of an example, and without intending to limit the scope of the claims, when the first quarter in a basketball game ends, the clock expires, after which there is no play. This expiration of the clock is detected to distinguish between an event-state that is "in play" and one that is "not-in-play", or equivalent designations that indicate whether or not to advance to STEP 302. By way of another example, and without intending to limit the scope of the claims, if the clock starts in a football game following a time-out, that will indicate the game is once again "in play". In alternate embodiments, the event-state is not determined with reference to a clock, but with reference to another indication of whether or not the game is "in play" or not. By way of an example, and without intending to limit the scope of the claims, if the scoreboard in a baseball game indicates that it is the top of the first inning, then the game is "in play", but if the scoreboard indicates that no inning is being played or that the "7th inning stretch" is underway, then presumptively, the game is "not in play". In an alternate embodiment, the event-state is not determined. Rather, this step is skipped and the procedure advances immediately to STEP 302, where recording of the live video feed continues without break. Whether or not to deploy a step of determining an event-state is a design choice that will typically be based around conservation of processing and storage resources.

STEP 301 thus comprises constantly monitoring of the live-action event or the video feed to determine when the event-state is on, at which point the procedure advances to STEP 302. When the event-state is off, the procedure continues to monitor the event-state until it is "on" again. It will be understood by those in the art that the designations "on" and "off" are by way of an example, and not intended to limit the scope of the claims, and to the extent the user determines as a design choice what does and does not constitute an event-state, the designations chosen to distinguish between two event-states is also at the design-discretion of the user. In STEP 302, presuming the event-state is "on", or something analogous, then the received live video feeds are recorded.

In STEP 303, the live video feeds, the live-action event, or both are monitored to detect event-triggers using the following means for detecting event-triggers. In general, sensors and detectors monitor the video feeds and/or the live-action event pursuant to means described in more detail below. The detectors monitor for measurements or detections of values that exceed a predetermined threshold. A detected measurement that exceeds a predetermined threshold is assigned a value to the extent the specific event-trigger (measured value) exceeds the predetermined threshold. This value corresponds to a weight. In one embodiment, the more the detected value exceeds the predetermined threshold, the higher or greater the value assigned, and the higher or greater the corresponding weight. This weighted value is subsequently used along with additional weighted values, which correspond to additional event triggers using the same or additional detectors, to determine if and when an event-segment occurs. In one embodiment, the weight assigned to each of a plurality of values derived from additional detectors detecting event triggers indicates the degree of relative priority to give to each specific value when determining whether, in the aggregate, the plurality of detected event triggers indicate that an event-segment has occurred. By way of an example, and without intending to limit the scope of the claims, in a baseball game, the ball is monitored with a radar gun. If a pitch is detected to be 45 m.p.h., then it is too slow to be an actual pitch, and it is presumptively just the catcher throwing the ball back to the pitcher. Its speed will not exceed a predetermined value, and an event-trigger has not occurred. On the other hand, if a pitch exceeds a predetermined value of 80 m.p.h., then an event-trigger occurs, because at that speed, it is presumed that the pitcher threw an actual pitch. If the pitch is 100 m.p.h., then it far exceeds the threshold value for event-triggers, and it is likely a fast ball that more likely corresponds to an event-segment because the batter is likely to swing and miss.

Frame by Frame Pattern Recognition

Frame by frame pattern recognition monitors video feeds for motion changes in the live action captured by the video feed. Frame by frame pattern recognition for pre-encoded and non-pre-encoded video content is well-known in the art.

In one embodiment, successive frames of a video feed are compared, and pixel color changes are detected. The number of instances of pixel color changes are monitored to determine if the number of pixel color changes exceeds a predetermined threshold. In an alternate embodiment, only those individual pixel color changes that exceed a difference in color intensity above a predetermined value are counted among the pixel color changes used to determine whether in the aggregate, the total number of pixel color changes exceeded a predetermined threshold. In an alternate embodiment, rather than monitoring successive frames, every second, third and so forth number of frames are compared. In an alternate embodiment, the distribution of pixel color changes is monitored. By way of an example, and without intending to limit the scope of the claims, the distribution of a single pixel color is monitored for changes above a predetermined threshold by converting the distribution of the single color (such as all green pixels) into a frequency distribution and monitoring changes in the frequency distribution, where frequency pertains to the frequency with which the color green appears within each frame. In alternate embodiments, frequency distributions of multiple colors or patterns of colors are monitored.

In an alternate embodiment, the number of pixel color changes that are monitored are localized within a selected portion of the image captured by the video feed. Thus, by way of example, and without intending to limit the scope of the claims, a video feed capturing a football game is monitored for the number of pixel color changes along the line of scrimmage. Typically, televised football games, including network feeds, impose a computerized blue line upon the televised image of the football game to indicate for the television viewer where the line of scrimmage exists on the football field for a specific play. In one embodiments, the line of scrimmage is located by detecting a high concentration of blue pixels in a specific area or region of the frame. Alternatively, in the event the super-imposed computerized line of scrimmage is a color other than blue, the video feed detects high concentrations of that color to locate the line of scrimmage. Video feed frames are then monitored within a predetermined localized area within the vicinity of the superimposed computerized line of scrimmage. Because movement indicating that a football play has begun typically involves players on both sides of the line of scrimmage crossing that line, it is sufficient to monitor only a localized area within the proximity of the line of scrimmage for pixel color changes to detect event-triggers.

Figure 4:
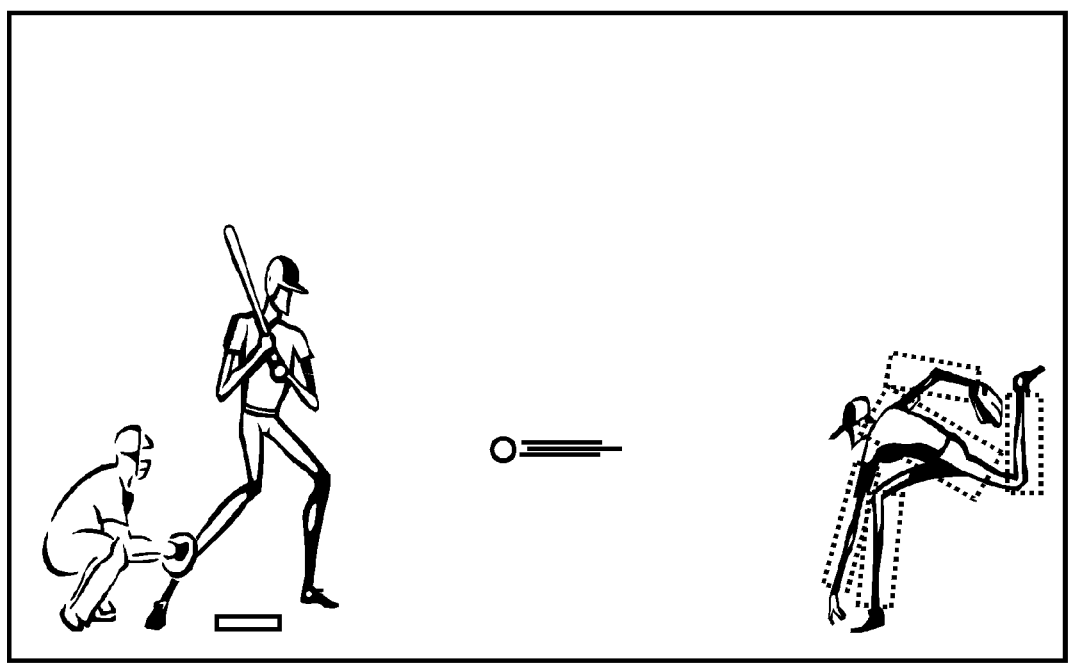
FIG. 4 is an illustration of one-embodiment of frame-by-frame pattern recognition that is used in conjunction with one-embodiment of the disclosed method of video-segmentation.

By way of an example, and without intending to limit the scope of the claims, FIG. 4 is an illustration of a frame from a video-feed that captures a pitcher in a baseball game delivering a pitch. For each successive frame in the video-feed that captures the pitcher delivering the pitch, including the frame depicted in FIG. 4, the pitcher is localized within the frame, and basic geometrical shapes and/or patterns are mapped onto the pitcher's body and limbs. The basic geometrical shapes are mapped onto the pitcher's body to encompass each of the pitcher's limbs. In one example, where the pitcher is wearing a white uniform, high concentrations of the color white are located and geometrical boxes are used to encompass those high concentrations. It is a design-decision for the user to determine the degree to which the geometrical shapes encompass the pitcher's limbs without simultaneously encompassing portions of the frame that do not capture the pitcher's limbs, i.e., the green grass. For successive frames, geometrical shapes are therefore mapped onto the pitcher's body. In alternate embodiments, rather than each successive frame mapping geometrical shapes onto the pitcher's body, every second, third and so forth number of frames are mapped with geometrical shapes encompassing the pitcher's body and the pitcher's limbs. Accordingly, as the pitcher makes his way through his wind up in his effort to eventually deliver the pitch, the aggregate geometrical shapes mapped onto the pitcher's body limbs will produce a configuration for each successive frame that is different. In other words, if each of the pitcher's limbs and his torso are mapped with a rectangular shape imposed upon the frame, the resulting configuration of rectangles will be different for each frame as the pitcher contorts his body differently to successively work his way through his windup. Thus, the pattern of geometrical shapes configured for each frame that encompasses each successive stage of the pitcher's wind-up and delivery changes between successive frames. Those patterns of geometrical shapes are monitored. When that pattern corresponds to a predetermined pattern, then an event trigger is registered. In this example, referring again to FIG. 4, the pattern of geometrical shapes encompassing the pitcher's body that results when his leg goes up into the air is the event-trigger. Successive frames are therefore monitored for this pattern, or an approximation of this pattern. Upon detection of this pattern, or an approximation of this pattern, an event-trigger is registered. As is clear from FIG. 4, the raised leg of the pitcher, and the resultant geometrical pattern that results, is most likely an indication that the pitcher is throwing a pitch. It is a design-decision for the user to determine, with respect to the geometrical pattern that constitutes the event-trigger, the degree and extent to which approximations of that pattern also constitute an event-trigger. In alternate embodiments, the geometrical shapes used to map onto a pitcher's or another player's body or limbs is not limited to rectangles, but also includes, without limitation, other shapes reasonably contemplated to efficiently encompass the person or object that is monitored for changes. These include circles, boxes, non-four-sided shapes, hexagons, and so forth. In an alternate example, and without intending to limit the scope of the claims, in a golf game, a pattern of geometrical shapes mapped onto a golf player hitting a golf ball is predetermined to constitute a certain position in a golf player's swing that constitutes an event-trigger. As an example, the pattern constituting an event trigger could be one that corresponds to rectangles mapped onto a golf player's body when he or she is at the back of his or her swing, and the golf club has been brought up over the shoulders and the line of the club is momentarily parallel with the ground. As an alternate example, for a music concert, a rock musician is notorious for holding a guitar and jumping up in the air with his legs spread in a signature style. Geometrical shapes are mapped onto successive frames of the video-feeds capturing the rock musician during the concert. The patterns of those geometrical shapes are monitored until they correspond to the predetermined pattern, or an approximation thereof, of geometrical shapes that correspond to the rock musician jumping in the air with a guitar and his legs spread in his signature way.

By way of an alternate example, and once again, without intending to limit the scope of the claims, a video feed capturing a baseball game is monitored for the number of changes within the strike zone only. Typically, a pitcher delivering a pitch will throw the baseball within the vicinity of the strike zone, which comprises an area in front of both the batter and the catcher. In this example, the strike zone is detected based upon a pixel-color distribution that correlates with predetermined pixel-color frequency distributions that indicate it. For example, the strike zone is monitored for pixel color changes exceeding a predetermined threshold.

By way of an alternate example, and once again, without intending to limit the scope of the claims, a video feed capturing a race-car race, such as a NASCAR race, is monitored for pixel color changes indicating two or more cars have moved relative to each other on the race-track. Typically, a video feed capturing a car race follows one or more cars advancing around the track, and by following the cars, the cars remain relatively fixed on the screen relative to the sides of the video image, or the frame, for at least a portion of time. Detecting certain concentrations of pixel colors allows a car to be located in a video feed. Similarly, certain concentrations of pixel colors allows the physical track, the protection wall, and the center area of the track to be located as well. Accordingly, if a video feed is following two cars moving down a straightaway on the track, the two cars are located, the track between the two cars is located, and a value is assigned to the number of pixels comprising the track located between the two cars. This value is monitored to determine whether it falls below a predetermined threshold within a specific number of frames. If so, this is likely to indicate that one car is advancing quickly upon the other car. To that extent, an additional value is determined that is weighted relative to how quickly the value indicating the space of track between the two cars changes relative to the number of frames. As described in more detail below, this weighted value is used, along with additional weighted values to determine if an event-segment has occurred. In this example, an event-segment would be one car passing another car on the straightaway.

By way of an alternate example, and once again, without intending to limit the scope of the claims, a video feed capturing a soccer game is monitored for pixel color changes for a given color, or a finite spectrum indicating a given color, which indicates rapid, swift and sudden movement of the video camera capturing the video feed. In one embodiment, frames are compared and a frequency distribution of pixel colors is determined across the entire frame. The frequency distribution is monitored for changes exceeding a predetermined threshold. Alternatively, a predetermined spectrum that indicates the color green, or whatever color may be the color of the field is used. If a frame or collection of successive frames indicates a high frequency distribution of green pixels for a given period of frames, then this presumptively indicates that the players are passing the ball around mid-field, or something uneventful. The frequency distribution of green pixels changes slightly as the ball progresses down the field, but not necessarily dramatically. Sometimes, when a player takes a shot of the soccer ball at the goal, the camera follows the ball towards the goal. Doing so, video feed image captures the goal, the area behind the goal, and spectators in the stands. The resulting image will most likely not contain a high frequency distribution of the color green. The frequency distribution for green will therefore drop dramatically (below a predetermined threshold) within a predetermined period of frames. The extent to which this frequency distribution drops below a predetermined threshold within a predetermined frame period is assigned a value, which will correspond to a weighted parameter input. Along with additional weighted parameters, to be described in more detail below, it will be used to determine if an event-segment (i.e., in this example, a shot on goal) has occurred.

By way of an alternate embodiment, frame-by-frame pattern recognition techniques well-known by those skilled in the art that perform face recognition is used to detect event-triggers. For instance, without intending to limit the scope of the claims, if a golfer appears on the video-feed, and the golfer does not wear a number, a uniform or any other article of clothing that identifies him or her with a respective team or other organization, frame-by-frame pattern recognition using face recognition techniques can identify the golf player. Face recognition techniques and algorithms are well-known in the art. In alternate embodiments, frame-by-frame pattern recognition techniques using well-known OCR algorithms detect predetermined information within a video-feed frame. By way of an example, and without intending to limit the scope of the claims, an OCR algorithm detects the number worn by a specific player. That number can be algorithmically compared to a predetermined database of numbers that each correspond to a specific player, and along with additional event-triggers and information, a determination is functionally made with respect to the name of the player that is captured in video-feed. In alternate embodiments, video-filtering algorithms well-known by those skilled in the art can be applied to the video-feed to exacerbate, amplify or de-emphasize preselected color and/or pixel color distribution gradients within the video-feed frame, thereby facilitating the implementation of video-filtering and textual-filtering algorithms, such as an OCR program, to search for and find numbers, textual data, faces and other information within a frame that corresponds to event-triggers or additional information to determine if, when and what event-segment occurred. In this way, multiple, different event-triggers can be detected using a number of different detectors from within a succession of frames that do not seguey between scenes, camera angles or fades to black.

Physical Sensors

Physical sensors located at the premises hosting the live-action event captured by the video feed monitor changes in the live action event without recourse to the video feed itself. In one embodiment, physical sensors located at the live-action event monitor changes that exceed a predetermined threshold. A value is assigned to the extent to which those changes exceed the predetermined threshold, and that value corresponds to a weighted parameter input, which, along with additional parameters, as herein described, is used to determine if a event-segment has occurred.

By way of an example, and without intending to limit the scope of the claims, radar guns monitor the speed of pitches to detect those that exceed a predetermined threshold. By way of another example, and without intending to limit the scope of the claims, a radar detector detects movement—namely a running batter—between third-base and home base, which presumptively indicates that an important play is happening. By way of another example, and without intending to limit claims scope, a radar detector monitors cars exceeding a predetermined speed in a race, presumptively indicating that one car may be attempting to pass another car or one car may be making some other sort of strategic move along the racetrack that will be an event-segment. In an alternate embodiment, Global Navigation Satellite Systems, including GPS, are used to detect the time, location and velocity of participants in a live-action event. By way of an example, and without intending to limit the scope of the claims, race-cars equipped with GPS monitor each car's position for whether it is approaching the finish line or whether one racecar is swiftly approaching another racecar. By way of an alternate example, and without intending to limit the scope of the claims, marathon or other long-distance runners are equipped with RFIP tags within their shoes that emit electromagnetic fields and/or frequencies that trip detectors for detection that a runner is at a specific location at a specific time. In alternate embodiments, motion-detection and velocity-detection mechanisms well-known in the art are used to detect event-triggers. Except where otherwise stated, the claims are not intended to be limited to physical sensors in the form of radar detectors or other types of detectors that use microwaves, radio waves or any other type of electromagnetic waves or sound waves deployed in any form to detect and measure range, altitude, direction, and/or speed of people, players or objects in a live-action event or sporting event.

In alternate embodiments, the video-feed is monitored for detections by physical sensors that are inherent to the game or live-event that is being filmed. By way of an example, and without intending to limit the scope of the claims, in a football game, the possession arrow is monitored to indicate changes in possession. Upon detecting that the possession arrow has changed, an event-trigger is registered because it is most likely that an event-segment, such as a fumble or an interception, has occurred.

Audio Recognition

Audio and speech recognition monitors the audio component of video feeds for changes in the live audio captured by the video feed. Audio and speech recognition for pre-encoded and non-pre-encoded audio content is well-known in the art. By way of an example, and without intending to limit the scope of the claims, a video feed capturing a soccer game is monitored for significant changes in the announcer's voice. Typically, a video feed capturing a soccer game contains an audio feed that principally comprises an announcer commenting upon the live-action of the soccer match. Often, an announcer will raise his or her voice in the event that a goal is scored. In this embodiment, changes in decibel levels above a predetermined threshold are monitored. Other times, it is not uncommon for an announcer to shout the word "Goal!", or whatever word that signifies a goal in the language spoken by the announcer, for an extended period of time, sometimes on the order of 15 to 30 seconds, or more. Therefore, in an alternate embodiment, independently or in addition to monitoring the decibel level of the audio feed, the period of time that the decibel level of the audio feed exceeds a predetermined threshold is monitored. In an alternate embodiment, the time that the audio feed remains within a predetermined vicinity of any decibel level is monitored. To the extent this time exceeds a predetermined threshold time, it can presumptively indicate that the announcer is shouting "GOAL!", and that an event-segment may have occurred. In this embodiment, therefore, time, rather than a decibel level, is monitored. As mentioned, alternative embodiments measure both time and decibel levels with predetermined weightings relative to each other to assign a value to the extent to which any or all of the measured values exceeds the predetermined thresholds. In an alternate embodiment, the decibel level of the crowd at the stadium or arena where a live-action sporting event is occurring is monitored for changes above a predetermined threshold to indicate that an event-segment may have occurred because everybody is suddenly cheering.

Scoring Information

Scoring information is monitored for event-triggers to detect possible changes in the live-action event that may indicate an event-segment has occurred. In one embodiment, scoring information is monitored without recourse to the video feed itself. Rather, official scorekeepers for a sporting event typically input scoring values into a database that is accessible. When a scoring value changes, based upon the extent to which that change exceeds a predetermined threshold, that change is assigned a weighted value that can be used, in addition with other parameters and other weighted values, to determine if an event-segment occurred. In addition, the time of the scoring value change is recorded. The change to a particular score itself constitutes, in certain instances, an event-trigger. By way of an example, and without intending to limit the scope of the claims, the official scorekeeper's database indicates that the game's score changes from 0-1 to 0-2 at time 3:01 p.m. This is likely because a goal was scored a time within proximity of 3:01 p.m. In this way, the video-segment can be clipped with a predetermined number of seconds both before and after the time 3:01 p.m., and the scoring event will be captured by the video-segment. By way of another example, and without intending to limit the scope of the claims, if the official scorekeeper's record indicates that one of the teams recorded an error at 4:01 p.m., then it is presumptively likely that the video feed within a 10 or 20 second vicinity should be video segmented. By way of an alternate example, if the official scorekeeper's score indicates that a third strike has been recorded, then a video segment within the vicinity of that strike can be segmented. In this way, score changes, which depend on the sport or event being captured by the live-event video feed, and comprise, without limitation, runs, errors, hits, singles, doubles, triples, home-runs, strikes, balls, walks, fouls, points, touchdowns, field goals, safeties, tackles, interceptions, fumbles, sacks, punts, downs, goals, yellow cards, red cards, turnovers, penalty shots, baskets, three-point shots, foul shots, time-outs, and so forth. The breadth and variety of scores, figures and events that are recorded depends on the sport, the league, the type of event, and the foregoing is not intended to limit, in any way, the scope of scores, figures, records and events that are recorded and can act as event triggers. In an alternate embodiment, rather than accessing the database of an official scorekeeper for a given sporting event or other type of event, scores, figures and events acting as event triggers can be unofficial and generated by any means generally known in the art to do so. In an alternate embodiment, a single video feed capturing only the score-board can be monitored using frame-by-frame pattern recognition, or alternative means to monitor the score, to detect scoring information changes.

Scoreboard Information

In addition to scoring information, scoreboard information is monitored for event-triggers. Scoreboard information comprises information that marks the progression of a live-action event or a sporting event, and in addition to scoring information, scoreboard information typically appears on the scoreboard at the live-action event. In one embodiment, scoreboard information comprises time, and it is indicated on clocks that dictate the beginning, end as well as different stages of a given sporting event. By way of an example, and without intending to limit the claims, the clock in a basketball game is scoreboard information. In one embodiment, in a professional NBA basketball game, where each team has 24 seconds to shoot the ball before losing possession of the ball, the shot clock—which monitors this 24 second window—is monitored until it falls below a predetermined value, such as 3 seconds. Because basketball players typically scramble to make a play and/or shoot the ball before the shot clock expires, an event-segment may presumptively occur between 0 and 3 seconds on the shot clock. Similarly, the 45 second shot clock in college basketball is monitored as score-board information to detect if it falls below a pre-determined threshold. By way of another example, and without intending to limit the scope of the claims, the clock in a football game is monitored to determine when it is within a predetermined time before 2:00 minutes are left within the first or the second half. By way of an alternate example, and without intending to limit the claims, for any live-action event or sporting event that occurs within a specified period of time, and for which there is a clock, the clock is monitored until it falls below or within a predetermined time before the event or the game, or a section or portion of the game (i.e., the quarter, half, period, and so forth) expires. Presumptively, the time right before the expiration of a sporting event is likely to contain event-segments. By way of another example, and without intending to limit the claims, starts and stops of the clock are monitored. In alternative embodiments, non-clock parameters are monitored for event-triggers that might be indicative of an event-segment. By way of an example, and without intending to limit the claims, the beginning or end of an inning in a baseball game is monitored. In this way, scoreboard information, which includes, without limitation, timing and other related information indicating the progression of a live-action or sporting event is monitored for event-triggers. Different scoreboard information that constitute event-triggers, such as 2 seconds remaining on the shot clock in a basketball game, are assigned values that correspond to a weighting. This weighted parameter is input along with additional weighted parameters, described in more detail herein, to determine if an event-segment has occurred.

External Metadata

External metadata is monitored for event-triggers. External metadata constitutes information regarding a live-action event, such as a sporting event, that can reflect the likelihood of an event-trigger, which is not scoring information or scoreboard information. For any live-action event, a host of facts, figures, statistics and changes can be monitored that are not scoring information and do not typically appear on a scoreboard. External metadata therefore comprises information, including, without limitation, facts, figures, statistics and changes in a live-action event that indicate that something, like an event-segment, is happening. By way of an example, and without intending to limit the scope of the claims, during a professional football game, when one team chooses to punt the ball, the hang-time of the ball—i.e., the time for which the ball is in the air—is a fact that can be monitored. A detector that detects a punted ball's hang-time to exceed a predetermined threshold can, according to certain user preferences, constitute an event-trigger.

Turning back to FIG. 3 in STEP 304, it is determined whether the plurality of one or more event-triggers indicate that an event-segment has occurred. To determine whether an event-segment has occurred, the event-triggers are algorithmically compared. In one embodiment, each of the event-triggers are assigned weighted values that correspond to the weight that should be given to each detected event-trigger. In alternate embodiments, each respective detector that is monitoring for an event-trigger is also assigned a weight, which either alone or in combination with the weights assigned to each respective event-trigger, correspond to how event-triggers from different detectors should be weighed relative to each other. Put another way, each event-trigger is assigned a predetermined weight that corresponds to the weight of the detector that detected that event trigger relative to the detectors that detected additional event-triggers. By way of an example, and without intending to limit the scope of the claims, an audio detector located at a baseball stadium to monitor changes in the decibel level of the crowd may be assigned less weight then a physical sensor that indicates a batter swinging a bat. This is because a batter swinging at a pitch is most likely, though not definitively, a more reliable indication that an event-segment has occurred than a rise in the crowd's volume. This is because large-stadium baseball crowds typically afford fluctuating decibel levels that are not necessarily directly tied to events transpiring in the game. In an alternate embodiment, an event-trigger is weighted based upon how likely it is that that event-trigger corresponds to a event-segment. This weight is assigned independent of any other detectors. Rather, by way of an example, and without intending to limit the scope of the claims, a frame-by-frame pattern recognition detector for a soccer game that registers a sharp change in the frequency distribution of the color green in the video feed during a short period of time is given more weight than a small change in the frequency distribution of the color green over a longer period of time, presuming that in both instances, the frequency distribution was high enough to exceed a predetermined threshold and thereby constitute an event-trigger. The shorter, sharper frequency distribution change more likely indicates a shot on goal, whereas the gradual frequency distribution change may only indicate a kick down the field. In still another embodiment, event-triggers are assigned weighted values based on a combination of the foregoing two means to assign weighted values.

The respective weightings that are assigned to event-triggers and to different detectors are algorithmically compared to determine whether an event-segment has occurred. In one embodiment, each of the weighted values are added and/or operated upon in conjunction to determine whether the result exceeds a predetermined threshold. In an alternate embodiment, the weighted values are added and/or operated upon in conjunction to determine whether the result falls within a predetermined range of values. In these embodiments, operation performed upon the weighted values in conjunction can include, without limitation, by way of an example and without intending to limit the scope of the claims, any form of algebraic or other operations, including, but not limited to, addition, subtraction, multiplication, division, conditional operations, on/off operations, where a weighted value or the result of an operation either equals a predetermined value or not. In an alternate embodiment, the weighted values are added and/or operated upon in conjunction to determine whether the result is greater than or equal to, or in the alternative, less than or equal to, a predetermined value. In alternate embodiments, one or more of the following operations are performed upon the one or more of the weighted values to calculate a result that is then used, subsequently, along with additional results to calculate further results corresponding to a predetermined threshold.

Each time a detector registers an event-trigger, the time of the event trigger is recorded. In one embodiment, for each detector that registers an event-trigger at the same exact time, only the weighted values assigned to each of those detected event-triggers are algorithmically compared, and only using those event-triggers, it is determined whether an event-segment has occurred. In an alternative embodiment, for each detector that registers an event-trigger within a predetermined range of time, each of the assigned weighted values corresponding to the event-triggers within that range of time are compared. This is because different detectors may detect event-triggers corresponding to the same event-segment, but at different times. By way of an example, and without intending to limit the scope of the claims, a radar gun detecting a batter's swing may detect the speed of the swing before an audio detector detects an increase in the crowd noise, which occurs before the scoreboard indicates "STRIKE 1". Because each of the foregoing three detections constitute three different event-triggers that nevertheless correspond to the same event-segment, i.e., a batter swinging and missing, but because all three event-triggers occurred within a predetermined range of time, all three event-triggers are weighted and algorithmically compared to determine if an event-segment occurred.

Figure 5:
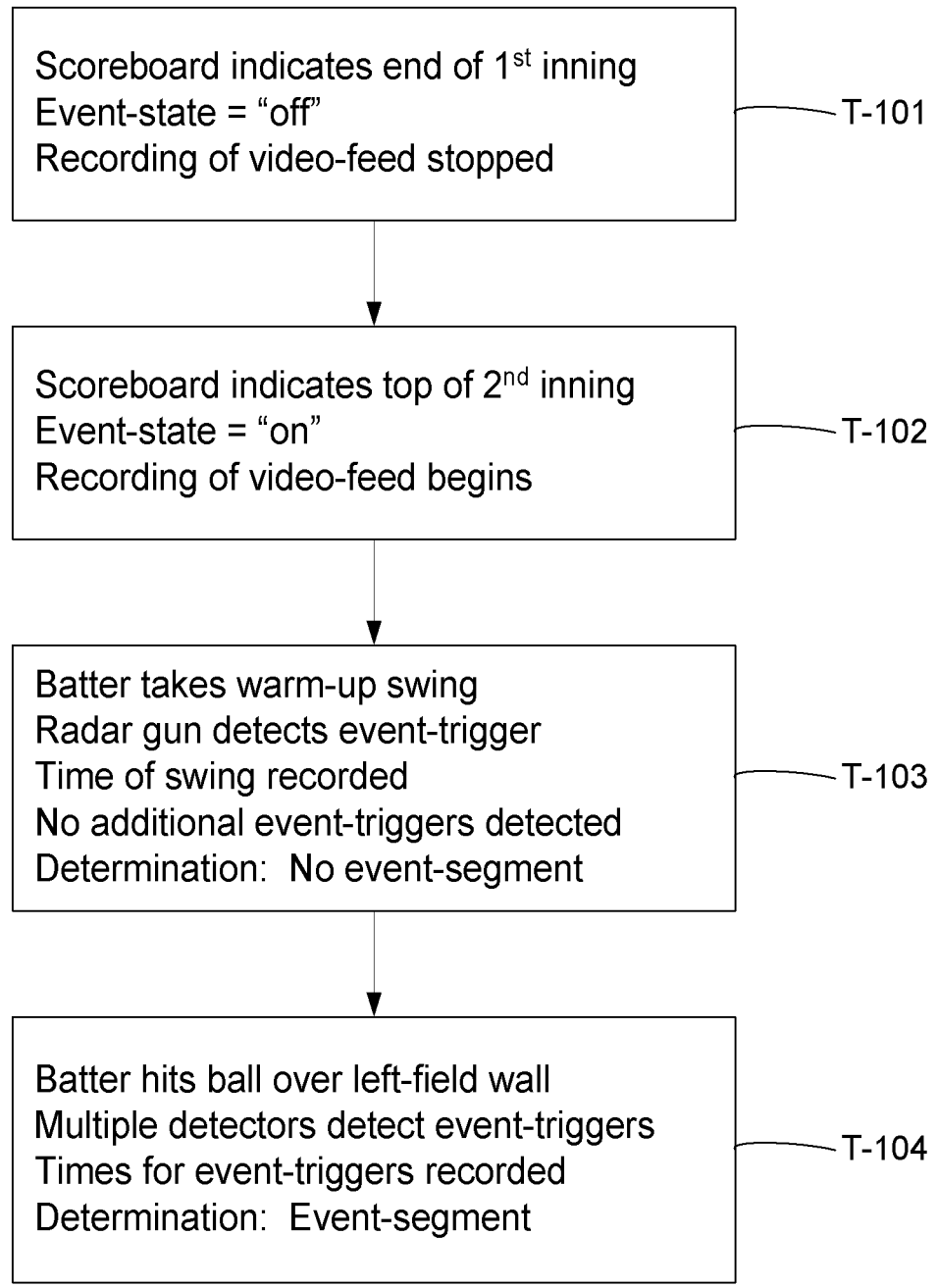
FIG. 5 is a flowchart illustrating one-embodiment of the disclosed method of video-segmentation.

FIG. 5 is a flowchart illustrating an exemplary example of video-segmentation. This example is directed to video-segmenting an event-segment during a live broadcast of a baseball game. Initially, before video-segmentation occurs, live video-content of the baseball game is captured by a camera, and the video feed is input into the ORB Box, as previously described, or into a server that performs pre-encoding and then transmits the video feed to the Cluster, or into another server for the purpose of performing video-segmentation. As discussed above, whether or not to bifurcate pre-encoding and video-segmentation among two or more distinct processors, servers, clusters or grids is a design-decision to account for each user's available processing power and storage capacity.

FIG. 5 is an example of a single video feed. At time T-101, the event-state is monitored via the scoreboard, which indicates that it is the end of the first inning and that the game is not currently in-play. The event-state is therefore indicated to be "off", and recording of the video feed, which is most likely airing a commercial break, is stopped. At time T-102, the scoreboard indicates that it is the top of the second inning, and accordingly, the event-state changes to "on". Recording of the video feed then begins.

At time T-103, the batter takes a warm-up batting swing. A radar gun located at the baseball stadium measures the speed of the warm-up swing. Initially, a predetermined threshold velocity is determined. This threshold is assigned is heuristic, empirical or estimated. In this example, the threshold velocity was determined based on the likelihood that a swing above a given speed corresponds to a swing at pitch. Sometimes, batters in a baseball game taking a warm-up swing will not swing the bat too quickly. At times this is due to a physical weight attached to the end of the bat that slows the swing's velocity. Other times, batters swing the bat very quickly during a warm-up swing. Most often, batters swinging at an actual pitch during the game swing the bat very quickly, and less often do they swing it slowly. Thus, the predetermined threshold velocity is determined to be a velocity that exceeds what is normally considered to be a "slow" warm-up swing at bat. The radar gun measures the batter's swing at time T-103 and determines that it exceeds a predetermined threshold velocity. The time that the radar gun detects the warm-up swing is recorded as T-103, and the warm-up swing is registered as an event-trigger. No other detectors detect an event trigger. The frame-by-frame pattern recognition is monitoring pixel-color changes within the vicinity of the strike-zone. Because the batter is taking has taken a warm-up swing before stepping up to the plate, these swings are not detected. The audio detectors do not detect a significant rise in the decibel level of the crowd. The scoring information, the scoreboard information and the external metadata do not change. A value is assigned to the radar gun's detection of the warm-up swing. In this example, the value corresponds to a number of different factors. First, this value corresponds to the extent to which the warm-up swing's velocity exceeded the predetermined threshold velocity. In this example, the value is normalized and assigned a weight that is directly proportional to the extent to which the warm-up swing's measured velocity exceeded the predetermined threshold velocity. In this example, the value is additionally weighted by the relative importance initially assigned to the radar gun's detections with respect to the other detectors in use (frame-by-frame pattern recognition, audio detectors, scoring information, scoreboard information, and external metadata for the purpose of determining if an event-segment occurred. In this example, frame-by-frame pattern recognition is assigned the greatest weight compared to the other detectors, followed by scoring information and scoreboard information, which are equally weighted, followed by the radar gun, followed by the other detectors. Finally, the value is additionally weighted by a factor that reduces its weight in the event that a radar gun affirmatively detects an event trigger, but neither the scoring information detector nor the scoreboard information detector affirmatively detect an event trigger.

The weighted value assigned to the radar gun's detected event-trigger is then algorithmically compared to the other weighted values that correspond to other detected event triggers. In this example, any additional event-triggers that occurred within a predetermined three-second vicinity of T-103 (i.e., three seconds before T-103 and three seconds after T-103) are compared with the radar gun's event-trigger value. In this example, it is initially determined that if a radar gun detects an event trigger, all other detected event triggers will be compared to each other provided they fall within the six-second window straddling the radar guns' event trigger. Because there was only a single event-trigger within a three-second vicinity of T-103, as well as for other reasons with respect to the specific weighting of an event-trigger detected by a radar gun in the absence of any scoring information or scoreboard information event-triggers, it is determined that an event-segment has not occurred. Recording of the live video feed continues. None of the recorded video is trimmed and appended with metadata to produce a video-segment.

The batter then steps up to the plate, the pitcher and the catcher exchange signals, and the pitcher then winds up and delivers a pitch. At time T-104, the batter swings the bat and hits the ball, which travels over the outfield and then over the left-field wall. Frame-by-frame pattern recognition detects the batter's swing within the strike zone, and it records the time of the swing. Frame-by-frame pattern recognition also detects a marked increase in the pixel-color frequency distribution of a predetermined selection of colors heuristically determined to correspond to an image comprising fans in the stands. The time of this detection is also recorded. A radar gun detects the speed of the swinging bat, and the time of the swinging bat is recorded. Audio detectors detect a marked increase in the decibel level of the crowd, and the time at which the rate of increase of the decibel level is highest is recorded. Scoring information indicates that a run has scored, and the time the score changes is recorded.

In this example, the time that is recorded for each registered event triggers is predetermined. For instance, frame-by-frame pattern recognition records the time when the rate of change of the pixel-color frequency distribution is the fastest. Alternatively, the time recorded by a frame-by-frame pattern recognition event trigger could be the time the frequency distribution begins to change. In still alternative embodiments, it is a design-decision what time to record as the time of the change in pixel-color frequency distribution. In some embodiments, the times for event-triggers, such as a radar gun detecting a swinging bat, default for the times of other event-triggers, such as a changing pixel-color frequency distribution. Because video-segments are trimmed with extra seconds before and after the event-segment, pinpointing the exact moment the event-segment occurs is not typically necessary. In alternate embodiments, the median time for a plurality of times corresponding to event-triggers all falling within a predetermined range of time is a means for determining the time of the event-trigger for the purpose of determining the number of seconds to add both before and after the event-trigger to trim the video feed into a video-segment.

The event triggers detected by each of the foregoing detectors, including the frame-by-frame pattern recognition, the radar gun, the audio detector, the scoring information and the scoreboard information are heuristically assigned weighted values. In this example, each weighted value accounts for a number of factors including, the extent to which a each measured detection exceeded a predetermined threshold, when applicable, (for instance, scoring information is not detected on the basis of the change in score exceeding a predetermined threshold). Also, the relative weight of each of the sensors with respect to one another is accounted for. Also, a weighting factor that accounts for how much weight to give certain detectors when other detectors detect an event-trigger. For instance, in this example, the radar gun's detection is more heavily weighted than the example at time T-103 because scoring information also detected an event-trigger, which is an indication that the batter's swing amounted to a change in the score, and possibly a homerun or an RBI, which is most likely an event-segment that viewers will wish to see again. The collection of weighted values assigned to the detected event-triggers are then algorithmically compared, and it is determined that an event-segment did in fact occur.

It will be appreciated by those skilled in the art that different live-action events contain different event-segments, and accordingly, require different event-triggers. In addition, different live-action events require that detectors measure different values, and predetermined threshold determinations will differ with respect to determining if event-segments-specific to each live-action event-actually occurred. Accordingly, different live-action events contain different event-segments that can be detected using a variety of algorithms that input values assigned to the event-triggers that can be preprogrammed and tailored by the user to meet the demands of the live-action event that is being monitored. Weightings determinations between respective detectors, as well as assignment of respective weights, are likewise different for different live-action events, and each corresponding algorithm.

Turning back to FIG. 3, if it is determined in STEP 304 that an event-segment has occurred, then in STEP 305, it is determined where to clip the beginning and end of the video-clip so that it includes the event-segment. In one embodiment, event-triggers are used to determine how long the event-segment should be. By way of an example, and without intending to limit the scope of the claim, the scoreboard indicates that a strike occurred, a physical sensor indicates that the batter swung, and frame-by-frame pattern recognition does not indicate that a pre-selected pixel color's frequency distribution did not exceed a predetermined level (thereby indicating that the batter did not hit a foul ball, but swung and missed the ball). Typically, baseball viewers interested in downloading a batter swing and miss a ball will only be interested in viewing a few seconds before the swing and only one or two seconds after the swing. Accordingly, using detectors, including the scoreboard-information indicating a strike has occurred, the recorded live video feed is trimmed to produce a video-segment that commences five seconds before the swing (or one of the recorded times registered by one of the detectors registering the swing as the event-trigger) and two seconds after the swing. The number of seconds that the live video feed is trimmed both before and after the event-trigger time is a design-decision that can be altered by the user depending on the live-action event. By way of another example, and without intending to limit the scope of the claims, the scoreboard indicates that a run is scored, the frame-by-frame pattern recognition indicates an increase in pixel-color distribution at a level that has been heuristically determined to indicate that the camera is panning over the crowd, and the audio detectors measure a decibel level among the crowd increase that greatly exceeds a predetermined threshold. Typically, baseball viewers interested watching the high-light of a homerun prefer it to begin shortly before the batter hit the ball, to include the wind-up and delivery of the pitch by the pitcher, and to end shortly after the ball lands in the stands, so that viewers can watch fans scramble to pick up the ball. Accordingly, using detectors, including scoreboard-information indicating that a run has scored, or scoring information indicating that a homerun has occurred, the recorded live video feed is trimmed to produce a video-segment that begins five seconds before the swing and ends forty seconds after the swing. In this example, the swing is used as the event-trigger that records a time from which both the beginning and end of the video-segment are measured. Alternatively, the decibel increase among the crowd, or some other event trigger, could be the measuring point for the event-segment, in which case the length of time trimmed before and after that respective event-trigger will likely be different.

It will be appreciated by those skilled in the art that in an alternative embodiment, additional inputs can heuristically guide the determination of when to trim the live video feed to begin and end the event-segment so that it becomes more consistent with the user's preferences over time. In this embodiment, therefore, a manual operator can manually override the beginning and end time determined for a given video-segment. By way of an example, and without intending to limit the scope of the claims, a heuristically developed algorithm trims the video-feed of a homerun to commence five seconds before the batter's swing and to end 30 seconds after the batter's swing. A manual operator command is received that overrides those beginning and end parameters for the video-segment so that it ends 40 seconds after the swing because 30 seconds failed to capture the fans scrambling for the ball in the stands. Going forward, in the event that an event-segment is being trimmed for a homerun, the determination for when to begin and end an event segment will be consistent with the prior manual override. In one embodiment, a calculation is made of the difference between what was initially calculated (30 seconds from event-trigger until end of video-segment) and the resulting video-segment with manual override (40 seconds). In this example, the difference is 10 seconds. Going forward, 10 seconds are added to any calculation for a homerun for the time determined from the event-trigger until the end of the video-segment. For additional received manual overrides for the same event-segments, the average difference over multiple over-rides is calculated and added or subtracted from the initial algorithmically determined time. In this example, an additional over-ride for a homerun that adds 8 seconds will, subsequently, for the third homerun, add 9 seconds, provided there is no received manual over-ride for the third homerun. In this way, a system and/or process suitable as an embodiment of the present disclosure can effectively learn how to best trim the video-segments to align with user-preferences for different event-triggers, different event-segments, and different live-action events.

Turning back to FIG. 3, in one embodiment, in STEP 306, the recorded video is clipped according to the determinations in STEP 305, and in STEP 307, information is added to the trimmed video-clip, and the resultant product is a video-segment. The added information comprises information that live-action spectators, such as fans, prefer to know about an event-segment. By way of an example, and without intending to limit the scope of the claims, a clip showing a homerun in a baseball game includes metadata comprising, without limitation, one or more of the following: a description of the event segment (such as "Homerun"), the batter's name, the game's score, the inning, the number of outs, the batter's batting average, and so forth.

Turning back to FIG. 1, in one embodiment, in STEP 108, menus are transmitted to registered devices. Initially, at some point, devices registered to receive video-segments according to an end-user's preferences are determined, which is described in more detail below. By way of an example, and without intending to limit the scope of the claims, an end-user initially register's a device to receive menus displaying available video-segments pursuant to a set of pre-selected preferences. By way of an example, and without intending to limit the scope of the claims, an end-user registers a device to receive menus displaying available video-segments from all baseball games on a given Saturday. Upon reception that a specific baseball game included on the transmitted menu has been selected, another menu is transmitted to the registered device showing all available video-segments for that specific baseball game.

Figure 6:
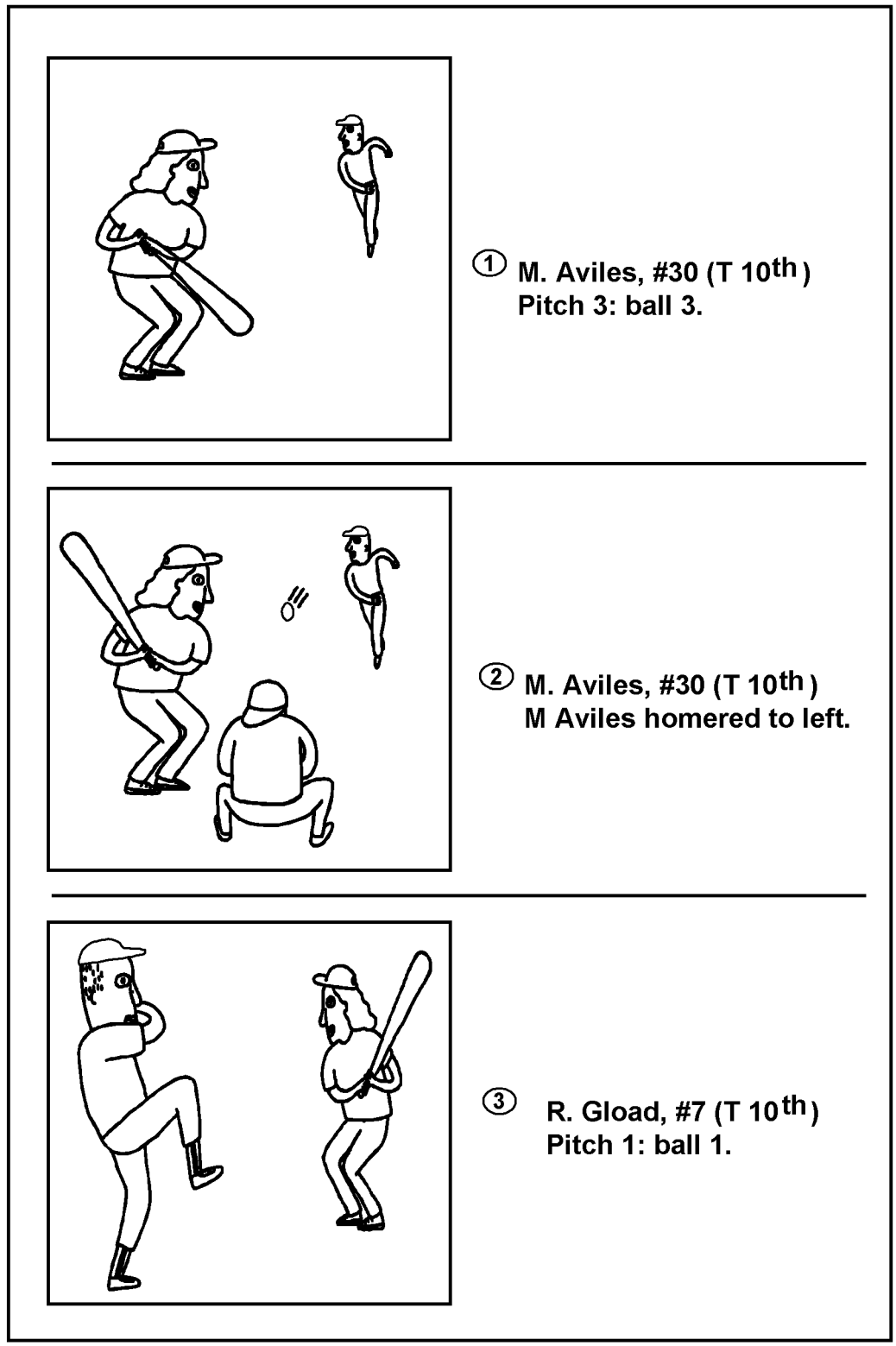
FIG. 6 is a snapshot of one embodiment of a menu displaying available video-segments.

FIG. 6 is an illustrative example of a menu transmitted to a registered device that shows available video-segments, along with attendant information, displayed on a registered device for a specific baseball game. In this example, the video-segments are listed from the top as the event-segments occurred chronologically during the game. The menu contains information that video-segment number 1 corresponds to the batter, M. Aviles, who wears the number 30 for his respective team, it is the top of the 10th inning, and the event-segment is that there was a ball thrown for the M. Aviles' third pitch at bat. Turning to number 4, the menu contains information that indicates that in video-segment number 2, M. Aviles hit a homerun to left-field. Finally, the menu indicates that video-segment number 3 is a video-clip of the event-segment wherein R. Gload, who wears number 7, received a ball on his first pitch. Additional embodiments with respect to the menu containing available video-segments is described in more detail below.

In one embodiment, the information describing the event-segment that appears on the menu in FIG. 6, and in some embodiments, is added to the video-feed to comprise the clipped video-segment, is generated as a function of the detected event-triggers. By way of an example, and without intending to limit the scope of the claims, referring to FIG. 6, in video-segment number 2, the textual data indicates that the video-segment contains a clip showing M. Aviles hitting a homerun to left-field. In this example, this event-segment was determined based, in part, upon detections of scoring information that indicated that the score had changed, as well as changes in scoring information indicating that one run had been scored for M. Aviles' team. The event-segment was also determined in part by other detected event-triggers, including external metadata that indicated that M. Aviles was still at bat, and a pitch was thrown, and no runners were on base, as well as other event-triggers that indicated that the period of time after M. Aviles swung his bat and before the scoring information changed was below a predetermined threshold. Together, that information was input into a function yielding the conclusion that M. Aviles hit a homerun. Additional event-triggers could have yielded detections that aided in this determination, including frame-by-frame pattern recognition of the number worn by the player at bat, which corresponds within a predetermined database to the number worn by M. Aviles. Accordingly, in a similar manner described above regarding detected event-triggers assigned weighted values and algorithmically compared to determine if and when an event-segment occurred, event-triggers can be input into functions that can narrow down the likelihood that what occurred—what the actual event-segment was—is only one among a database of predetermined possibilities. In this example, the time before the recorded time of a radar gun detecting the swinging of a bat and the recorded time of the scoring information changing, and the detection of external metadata indicating that no runners were on base, yielded the single conclusion that a homerun was likely hit, and this determination corresponds to a predetermined word, phrase or other form of textual data, which in this case is "homered". Similar determinations conclude that it was M. Aviles who hit the homerun, and that the homerun was hit to left-field. In this way, the event-triggers, along with the determination that event-segments occurred, can functionally correspond to textual data describing the event-segment that can be added to the event-segment to constitute the video-segment and be displayed in the menu to describe what event-segment is contained in the video-segment.

Turning back to FIG. 1, in STEP 106, the video-segment is transcoded. In this step, the video-segment is transcoded to a plurality of video/audio encodings compatible with the spectrum of different cellular telephone and personal computer operating system formats. Typically, different cellular telephone carriers deploy different and incompatible encoding regimes. In addition, different cellular telephone devices support different encoding regimes. Video-segments are therefore transcoded to a plurality of encodings to permit their transmission over a plurality of carriers to a plurality of mobile devices. Similarly, video-segments are transcoded for support by a plurality of protocols and encodings to personal computers over the internet. In alternate embodiments, transcoding comprises one of more of the following: changing a signal, such as a digital bitstream, for the purpose of, without limitation, compression, encryption or translation from one code to another, re-coding, and transcoding both lossy and lossless data. Transcoding as used herein is generally well-known by those skilled in the art, and the foregoing list is not intended to comprise an exhaustive list of all transcoding operations, nor by virtue of being listed here, is the foregoing list intended to limit the scope of the claims. In an alternate embodiment, the pre-encoded or not pre-encoded event-segment is already encoded to be compatible with a single cellular telephone carrier or registered device, and in this embodiment, encoding is unnecessary. In an alternate embodiment, the video-feed is transcoded to a plurality of encodings before event-segments are recorded and/or before event-segments are trimmed into video-segments.

Turning back to FIG. 1, in STEP 107, an end-user's device is appraised for different parameters for the purpose of determining the optimal means for transmitting menus of available video-segments as well as video-segments. Initially, an end-user's device is registered for the purpose of receiving video-segments. End-user devices capable of receiving audio/video content are widely known by those skilled in the art. These can include, without limitation, cellular telephones and/or personal computers. In one embodiment, an end-user receives video-segment via connection with the internet. In an alternate embodiment, an end-user receives a video-segment on a mobile device via Short-Message-Service (SMS) alert text message or a Multimedia-Messaging-Service (MMS) message from a Short-Message-Peer-to-Peer (SMPP) server. In an alternate embodiment, an end-user receives a video-segment on a mobile device via Wireless Application Protocol (WAP) server. In alternate embodiments, additional devices and means for receiving audio/video content well-known by those skilled in the art is used for the end-user to receive video-segments.

Appraisal of an end-user's device that has been registered to receive video-segments includes determining one or more parameters of the device, which include, without limitation, and by way of an example and without intending to limit the scope of the claims, the device's make and model, the device's carrier system, wireless mode and so forth. Following appraisal of these parameters, the optimal encoding and transmission parameters are chosen, including, without limitation, the optimal frame-rate, resolute, data size, video codec, audio codec. Following this determination, requested video-segments and menu-pages are transmitted to the end-user's registered device.

Turning back to FIG. 6, an illustrative snapshot of a screen on cellular telephone or personal computer belonging to an end-user whose device is registered to receive video-segments. Initially, in one embodiment, an end-user's preferences to access video-segments corresponding to categories of pre-selected event-segments will have been registered. By way of an example, and without intending to limit the scope of the claims, an end-user's preference to access all video-segments for Saturday's baseball game between the Philadelphia Phillies and the New York Mets will be registered, and only video-segments satisfying that criteria, i.e., from that game, will be transmitted to that end-user's device. Alternatively, in addition to preferences to view select games, an end-user's preferences to access only video-segments for certain sports, players, musicians and so forth can be initially selected. By way of another example, and without intending to limit the scope of the claims, only video-segments from a specific game where a player hits a homerun can be provided to an end-user's device. In alternate embodiments, the textual data that is generated in connection with the determination if and when an event-segment occurred is catalogued in database that enables end-users to submit search requests, for those search requests to be received, and for a search program and/or video or textual filtering algorithms well-known by those skilled in the art to display all video-segments corresponding to the end-user's inputted search criteria.

In this embodiment, an end-user's mobile device, such as a cellular telephone, contains a WAP browser. The WAP browser enables the end-user to access a menu-page, shown in FIG. 6. An image corresponding to an event-segment is shown along with metadata describing the event-segment. Clicking or enabling the pictured event-segments thus prompts the cellular telephone or personal computer to display the video-segment corresponding to the event segment. In one embodiment, the most recent event-segments are at the top of the list, and by scrolling down, the end-user scrolls down to access event-segments that occurred earlier in time. In alternative embodiments, event-segments can be arranged according to different criteria. By way of an example, and without intending to limit the scope of the claims, event-segments can be arranged to show all home-runs first, followed by all strike-outs, followed by other pre-selected preferences for specific event-segments. Alternatively, all event-segments corresponding to a specific player or musician or song or race-car can be displayed first. In alternate embodiments, different camera views of the same event-segment can be displayed on the end-user's device for selection either before or after an end-user selects to display a particular event-segment. By way of an example, and without intending to limit the scope of the claims, an end-user's WAP-enabled device prompts an end-user to select an event-segment. Turning back to FIG. 6, the end-user selects the second video-segment, in which the information indicates that "M Aviles homered to left." Following this selection, the end-user's device is prompted to select from a plurality of camera views that captured the homerun hit by M Aviles at the same time. Initially, the video-feed will comprise a plurality of camera-feeds capturing video-content of the baseball game from different angles and/or perspectives. Although only one camera angle may be shown on television at one time, as broadcast by the particular television network and/or station broadcasting the baseball game, the end-user's device is enabled to select from a plurality of video-feeds capturing the same homerun.

It will be appreciated by persons skilled in the art that the present disclosure is not limited to what has been particularly shown and described herein. Rather, the scope of the present disclosure is defined by the claims which follow. It should further be understood that the above description is only representative of illustrative examples of implementations suitable for use with the invention.

What is claimed is:
1. A method for creating a video segment representing a portion of a live-action sporting event from one or more video-feeds, comprising:
  monitoring the live-action event video feeds;
    detecting one or more event-triggers with detectors, each event trigger being registered at a specific time;
    receiving external metadata from other than analysis of the video feeds and any accompanying text and audio streams;
    assigning each detected event trigger a weighted value representative of the confidence that an event of interest in the live-action sporting event may have occurred and;
    determining using an algorithm that is specific to the live-action event when an event-segment occurred by evaluating whether the aggregate of the weighted values of event triggers registered within a predetermined length of time that corresponds to a plurality of video frames, along with the external metadata, together indicate that an event-segment occurred;
    wherein the step of evaluating includes weighting the weighted values relative to one another based on the relative reliability of the detectors to one another; and
  editing one or more video feeds into the video-segment so that it is a continuous video that encompasses at least one event-segment.

2. The method of claim 1, further comprising the step of determining if the event-state is "on" or "off."

3. The method of claim 2, further comprising the step of recording one or more of the one or more video-feeds if the event-state is determined to be "on".

4. The method of claim 1, wherein the detectors comprise frame-by-frame pattern recognition detectors.

5. The method of claim 1, wherein the detectors comprise physical sensors.

6. The method of claim 1, wherein the detectors comprise audio recognition detectors.

7. The method of claim 1, wherein the external metadata includes scoring information regarding scoring values input into a database separately from the video feeds.

8. The method of claim 1, wherein the external metadata includes scoreboard information obtained without reference to the video feeds.

9. The method of claim 1, wherein the weighted value is assigned based upon the detected event-trigger exceeding a predetermined threshold.

10. The method of claim 1, wherein the weighted value is assigned proportionally based upon the detected event-trigger exceeding a predetermined threshold.

11. The method of claim 1, wherein each detected event-trigger is assigned a weighted value based upon the predetermined relative weight of the detector that detected the event-trigger.

12. A method as claimed in claim 11, wherein the the step of determining includes evaluating a detection by one detector in the absence of a detection by one or more other detectors.

13. A method as claimed in claim 11, wherein the weighted value is assigned to a particular event-trigger is based partially upon a detection by one detector in the presence of a detection by another detector.

14. A method as claimed in claim 1, wherein information describing the event-segment is added to the video-segment, the content of which is determined by the type of event triggers detected and the external metadata.

15. A method as claimed in claim 1, wherein one or more of the video-feeds comprise a pre-edited compilation of one or more video-feeds.

16. A method as claimed in claim 1, wherein the process of evaluating includes determining that the weighted values of one or more of the event triggers exceeds a predetermined threshold.

17. A method as claimed in claim 1, wherein the process of evaluating includes determining that the weighted values of one or more of the event triggers exceeds a predetermined range of values.

18. A method as claimed in claim 1, wherein the process of evaluating includes determining that the weighted values of one or more of the event triggers is greater than or equal to a predetermined value.

19. A method as claimed in claim 1, wherein the process of evaluating includes determining that the weighted values of one or more event triggers is less than or equal to a predetermined value.

20. A method as claimed in claim 1, wherein the process of evaluating includes determining that the weighted values of one or more event triggers equals a predetermined value.

21. A method as claimed in claim 1, wherein the algorithm is based on certain times during the live-action sporting event corresponding to predetermined event-triggers unique to the type of live-action sporting event.

22. The method of claim 1, further comprising the step of determining where an event-segment occurred based on the detected event-triggers.

23. The method of claim 22, wherein the process of evaluating includes matching the recorded time of an event-trigger corresponding to a pre-selected detector.

24. The method of claim 22, wherein the process of evaluating includes considering that an average of the recorded times of all event-triggers fall within a range of time with respect to the recorded time of an event-trigger of a pre-selected detector.

25. The method of claim 22, wherein one or more video feeds are edited into the video segment to encompass the event-segment based on when it is determined that an event-segment occurred.

26. The method of claim 22, wherein one or more video feeds are edited into the video segment by beginning and ending the video-segment based on predetermined times before and after the event-segment occurred for different types of event-segments.

27. The method of claim 22, wherein only those event-triggers with equal recorded times correspond to the same event-segment.

28. A system comprising:
one or more video-feeds capturing a live-action sporting event;
event-trigger detectors;
a source of external metadata other than analysis of the video feeds and any accompanying text and audio streams;
memory storage devices;
a computer process for assigning weights to each detected event trigger; wherein the weighted value is representative of the confidence that an event of interest in the live-action sporting event may have occurred;
a computer-processor for determining if an event-segment occurred based on the detected event-triggers;
wherein the computer-processor determines when an event-segment occurs by evaluating whether the aggregate of the weighted values of event triggers registered within a predetermined length of time, along with the external metadata, together indicate that an event-segment occurred; and
wherein the computer-processor is configured to, when it is determining whether an event-segment occurs, weight the weighted values relative to one another based on the relative reliability of the detectors to one another.

29. The system of claim 28, wherein the detectors comprise frame-by-frame pattern recognition detectors.

30. The system of claim 28, wherein the detectors comprise physical sensors.

31. The system of claim 28, wherein the detectors comprise audio recognition detectors.

32. The system of claim 28, wherein the external metadata includes scoring information from a database not derived from the video feeds.

33. The system of claim 28, wherein the external metadata includes scoreboard information detector without reference to the video feeds.

34. A method for identifying an event segment in a live-action sporting event, comprising:
monitoring at least one video feed of the live-action sporting event;
detecting one or more event-triggers with detectors;
receiving external metadata from other than analysis of the video feeds and any accompanying text and audio streams;
assigning each detected event trigger a weighted value representative of the confidence that an event of interest in the live-action sporting event may have occurred; and
determining if an event-segment occurred by evaluating whether the aggregate of the weighted values of event triggers registered within a predetermined length of time that corresponds to a plurality of video frames, along with the external metadata, together indicate that an event-segment occurred.

35. The method of claim 34, further comprising the step of determining if the event-state is "on" or "off."

36. The method of claim 35, further comprising the step of recording one or more of the one or more video-feeds if the event-state is determined to be "on".

37. The method of claim 34, wherein the detectors comprise frame-by-frame pattern recognition detectors.

38. The method of claim 34, wherein the detectors comprise physical sensors.

39. The method of claim 34, wherein the detectors comprise audio recognition detectors.

40. The method of claim 34, wherein the external metadata includes a scoring information detector input into a database separately from the video feeds.

41. The method of claim 34, wherein the external metadata includes scoreboard information without reference to the video feeds.

42. The method of claim 34, wherein the weighted value is assigned based upon the detected event-trigger exceeding a predetermined threshold.

43. The method of claim 34, wherein the weighted value is assigned proportionally based upon the detected event-trigger exceeding a predetermined threshold.

44. The method according to claim 34, wherein each detected event-trigger is assigned a weighted value based upon the predetermined relative weight of the detector that detected the event-trigger.

45. A method as claimed in claim 44, wherein the weighted value is assigned based upon a detection by one detector in the absence of a detection by one or more other detectors.

46. A method as claimed in claim 44, wherein the weighted value is assigned based upon a detection by one detector in the presence of a detection by another detector.

47. A method as claimed in claim 34, wherein information describing the event-segment is added to the video-segment, the content of which is determined by the types of event triggers detected and the external metadata.

48. A method as claimed in claim 34, wherein one or more of the video-feeds comprise a pre-edited compilation of one or more video-feeds.

49. The method of claim 34, wherein it is determined if an event-segment occurred based on an algorithm that is specific to the live-action event.

50. A method as claimed in claim 49, wherein the process of evaluating includes determining that on one or more of weighted values exceeds a predetermined threshold.

51. A method as claimed in claim 49, wherein the process of evaluating includes determining that on one or more weighted values exceeds a predetermined range of values.

52. A method as claimed in claim 49, wherein the process of evaluating includes determining that one or more of weighted values is greater than or equal to a predetermined value.

53. A method as claimed in claim 49, wherein the process of evaluating includes determining that one or more of weighted values is less than or equal to a predetermined value.

54. A method as claimed in claim 49, wherein the process of evaluating includes determining that one or more of the weighted values equals a predetermined value.

55. A method as claimed in claim 49, wherein the process of evaluating includes accounting for the fact that certain times during the live-action sporting event correspond to predetermined event-triggers unique to the type of live-action sporting event.

56. The method of claim 34, further comprising the step of determining where an event-segment occurred based on the detected event-triggers.

57. The method of claim 56, wherein the process of evaluating includes matching the recorded time of an event-trigger corresponding to a pre-selected detector.

58. The method of claim 34, wherein the process of evaluating includes considering that all event-triggers falling within a range of time within the time recorded for the event-trigger of said pre-selected detector correspond to the same event-segment.

59. The method of claim 56, wherein the process of evaluating includes considering that event-segment is more likely to have occurred when an average of the recorded times of all event-triggers fall within a range of time with respect to the recorded time of an event-trigger of a pre-selected detector.

60. The method of claim 56, wherein only those event-triggers with equal recorded times correspond to the same event-segment.

\* \* \* \* \*